United States Patent [19]

Kobayashi et al.

[11] Patent Number: 5,457,264
[45] Date of Patent: Oct. 10, 1995

[54] METHOD OF MELTING TREATMENT OF RADIOACTIVE MISCELLANEOUS SOLID WASTES

[75] Inventors: Hiroaki Kobayashi, Nakaminato; Jin Ohuchi, Hitachioota, both of Japan

[73] Assignee: Doryokuro Kakunenyro Kaihatsu Jigyodan, Tokyo, Japan

[21] Appl. No.: 288,602

[22] Filed: Aug. 10, 1994

[30] Foreign Application Priority Data

Aug. 25, 1993 [JP] Japan ................. 5-232380

[51] Int. Cl.$^6$ .................................. G21F 9/00
[52] U.S. Cl. ................. 588/19; 423/5; 588/15; 976/DIG. 394
[58] Field of Search ............... 588/19, 18, 231, 588/15; 75/393, 10.14; 423/5; 976/DIG. 394

[56] References Cited

U.S. PATENT DOCUMENTS

| | | | |
|---|---|---|---|
| 4,049,384 | 9/1977 | Wenckus et al. | 23/273 |
| 4,341,915 | 7/1982 | Adachi et al. | 373/22 |
| 4,402,724 | 9/1983 | Weisenburger et al. | 65/128 |
| 4,591,454 | 5/1986 | Ohtsuka et al. | 588/15 |
| 4,666,490 | 5/1987 | Drake | 65/27 |
| 4,816,228 | 3/1989 | Yoshida et al. | 422/159 |
| 5,082,603 | 1/1992 | Horie et al. | 252/628 |
| 5,127,941 | 7/1992 | D'Obrenan et al. | 75/588 |
| 5,185,104 | 2/1993 | Horie | 252/632 |
| 5,367,532 | 11/1994 | Boen et al. | 373/156 |

OTHER PUBLICATIONS

International Conference on Nuclear Fuel Reprocessing and Waste Management Recod, Aug. 23–27, 1987, pp. 723–729.

*Primary Examiner*—Ngoclan Mai
*Attorney, Agent, or Firm*—Wenderoth, Lind & Ponack

[57] ABSTRACT

A method of melting treatment of radioactive miscellaneous solid wastes containing therein an electrically conductive substance and other waste components. This method comprises charging the radioactive miscellaneous solid wastes into a cold crucible induction melting furnace provided with a high-frequency coil; supplying a high-frequency current to the high-frequency coil of the melting furnace to thereby heat and melt the electrically conductive substance, e.g. a metal, in the miscellaneous solid wastes; indirectly heating the other components in the miscellaneous solid wasted by utilizing the electrically conductive substance as a starting source of heating and melting; and placing the whole of the radioactive miscellaneous solid wastes into a molten state.

2 Claims, 1 Drawing Sheet

METHOD OF MELTING TREATMENT OF RADIOACTIVE MISCELLANEOUS SOLID WASTES

BACKGROUND OF THE INVENTION

The present invention relates to a method of collective melting treatment of radioactive miscellaneous solid wastes, without classifying them, by using a cold crucible induction melting process, and more specifically, to a method capable of collectively reducing the volume of and solidifying various kinds of radioactive solid wastes, such as inflammables, metals, glasses and other nonflammables.

Nuclear facilities or the like produce large amounts of radioactive miscellaneous solid wastes which contain in mixed form various kinds of substances, such as inflammables, metals, glasses and other nonflammables. Since such radioactive miscellaneous solid wastes have different radioactive levels or mixture ratios among various wastes-producing facilities, it is impossible to generally compare the radioactive miscellaneous solid wastes. However, in high-level solid wastes generated from reprocessing facilities, various substances are mixed, such as metals, woods, rags, etc. Although the mixture ratio differs with each operational condition, it is reasonably estimated that metals account for about 90% and the remainder consists of inflammables (rags or the like) and nonflammables (plastic sheets or the like).

For this reason, it is desired to develop an art capable of collectively and easily treating, i.e. volume-reducing and solidifying the radioactive miscellaneous solid wastes in which the waste components are not clearly classified and which exhibit various mixture ratios. A conventionally proposed method of melting treatment is a high-temperature melting method such as plasma melting.

However, in such a conventional high-temperature melting art, molten matter makes direct contact with constituent materials of a melting furnace, e.g. refractory materials of furnace-wall or electrodes, under melting temperature conditions for a substance to be melted. Accordingly, a countermeasure against high-temperature erosion (allowance for erosion or replacement of constituent materials) and the limitation of a melting temperature (the upper limit is the temperature below which the strength of constituent materials can be assured) become great problems. Specifically, the life of the constituent materials is short owing to severe high-temperature erosion, and large amounts of secondary wastes are generated as a result of the replacement of eroded constituent materials. In addition, since the melting temperature is limited, it is difficult to effect melting treatment of high melting-point metals.

SUMMARY OF THE INVENTION

An object of the present invention is to solve the above-described problems of the prior art and to provide a method of melting treatment of radioactive miscellaneous solid wastes which can simultaneously solve the problem of high-temperature erosion and damage sustained by the constituent materials of the melting furnace and the problem of the limitation of a melting operation temperature set by the heat-resistance temperature of the constituent materials of the melting furnace.

According to the present invention there is provided a method of melting treatment of radioactive miscellaneous solid wastes containing therein an electrically conductive substance and other waste components, said method comprising: charging the radioactive miscellaneous solid wastes into a cold crucible induction melting furnace provided with a high-frequency coil; supplying a high-frequency current to the high-frequency coil of the melting furnace to thereby heat and melt the electrically conductive substance in the miscellaneous solid wastes; indirectly heating the other components in the miscellaneous solid wastes by utilizing the electrically conductive substance as a starting source of heating and melting; and placing the whole of the radioactive miscellaneous solid wastes into a molten state.

Then, after the whole of the radioactive miscellaneous solid wastes has been melted, the molten matter is made to flow into a container, such as a canister, and cooled to form waste solidified matter. Also, after placing the whole of the radioactive miscellaneous solid wastes into the molten state by the aforesaid method, it is also possible to separate the respective molten waste components in the melting furnace on the basis of the difference in specific gravity among the molten waste components and cause the molten waste components to flow into individual canisters or the like by an overflow system or a bottom flow system so that the respective molten waste components can be separately discharged from the melting furnace.

Since metals contained in the radioactive miscellaneous solid wastes charged into the cold crucible induction melting furnace have electrical conductivity, when a high-frequency current is supplied to the high-frequency coil, the metals are induction-heated and melted by electricity flowing in the metals. That is to say, the metals become the starting source of heating and melting. Inflammables which surround the metals and nonflammables such as glass are indirectly heated by the heat generated from the metals. The inflammables contained in the radioactive miscellaneous solid wastes burn and reduce in volume, while the nonflammables melt. When glass substances are melted, they exhibit electrical conductivity, so that current flows in the molten glass in response to the high-frequency current of the high-frequency coil and the molten glass are directly heated. In this manner, the molten state gradually expands until the whole of the radioactive miscellaneous solid wastes reaches a molten state.

Since a floating force works on the molten metal itself by the action of an electromagnetic field, the molten metal does not make direct contact with the inner wall of the melting furnace. Since the surface of the molten glass which is in contact with the inner wall of the melting furnace becomes a solid layer (skull), the molten matter do not make direct contact with a furnace material. Thus, it is possible to prevent high-temperature erosion of the melting furnace. Also, since the melting furnace itself is water-cooled, the melting temperature of the miscellaneous solid wastes is not limited by the heat-resistance temperature of the melting furnace. Accordingly, it is possible to perform melting treatment of radioactive miscellaneous solid wastes at arbitrary temperatures by the supply of the required electrical power.

PREFERRED EMBODIMENTS OF THE INVENTION

Figure 1:
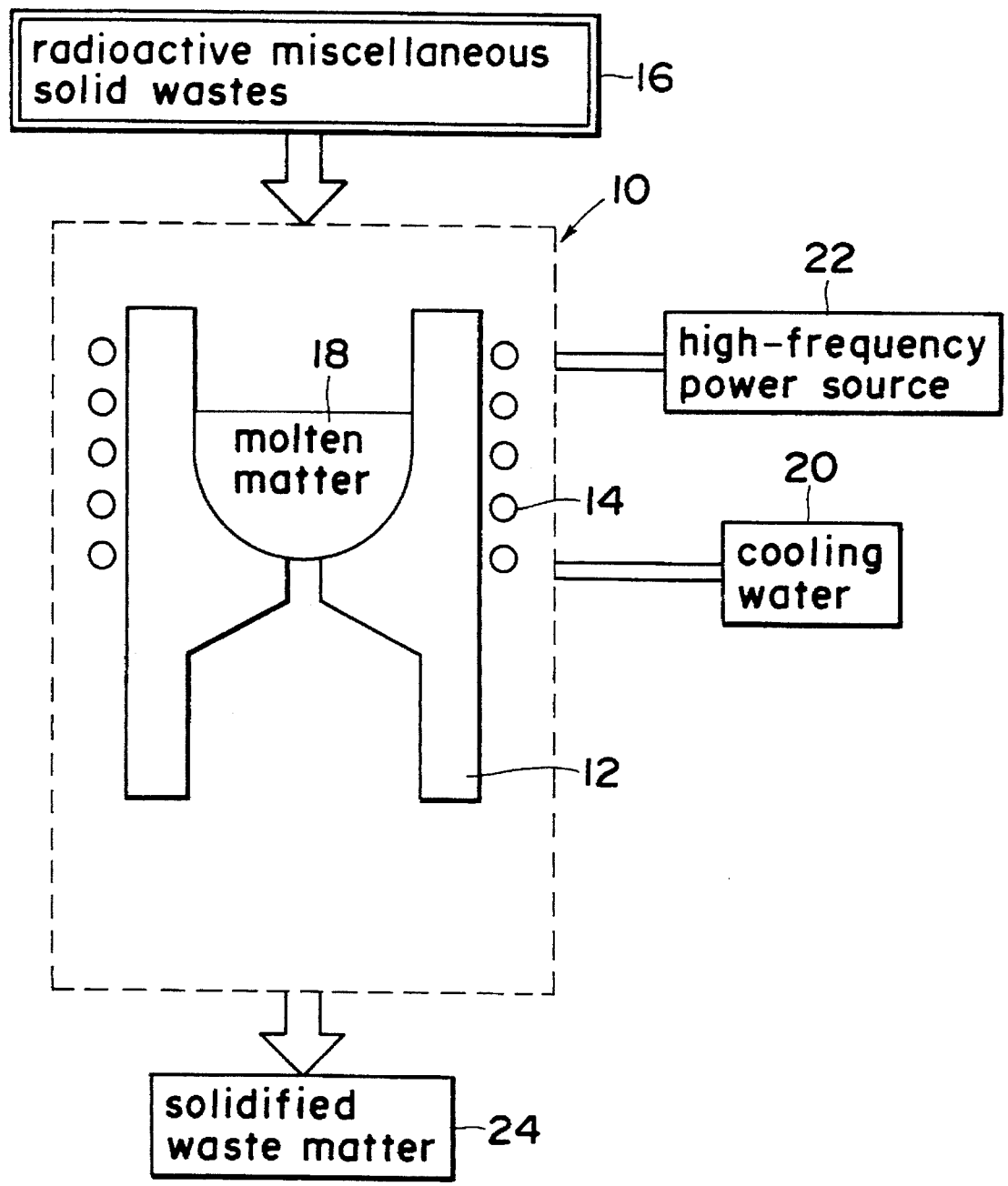
FIG. 1 is an explanatory view showing an example of a cold crucible induction melting furnace used in the present invention.

FIG. 1 is an explanatory view showing an example of an apparatus for carrying out the method of the present invention. A cold crucible induction melting furnace 10 has a construction in which a slit-divided water-cooled type of melting furnace 12 made of copper is installed in a water-cooled type of high-frequency coil 14. Radioactive miscellaneous solid wastes 16 are charged into the melting furnace 12. Then, cooling water 20 is circulated to cool the apparatus, and a high-frequency current is supplied to the high-frequency coil 14 from a high-frequency power source 22. Thus, the metals in the radioactive miscellaneous solid wastes are heated, and substances which surround the metals are indirectly heated by the heat generated from the metals. The inflammables contained in the radioactive miscellaneous solid wastes burn. The radioactive substances contained in the gases produced during the combustion are captured in an off-gas system (not shown). The other nonflammables are placed in a molten state. Among others, glass substances are directly heated since they exhibit electrical conductivity when they are melted. Accordingly, the molten state is expanded by continuing to supply the current to the high-frequency coil 14, and the whole of the inside of the melting furnace is filled with molten matter 18.

In the method of the prevent invention, since a floating force works on molten metal itself by the action of an electromagnetic field, the molten metal does not make direct contact with the inner wall of melting furnace 12. Since the surface of the molten glass which is in contact with the inner wall of the melting furnace 12 becomes a solid layer (skull), the molten matter 18 does not make direct contact with a furnace material. Thus, it is possible to prevent high-temperature erosion of the melting furnace. Also, since the melting furnace 12 itself is water-cooled, the melting temperature of the miscellaneous solid wastes is not limited by the heat-resistance temperature of the melting furnace. Accordingly, it is possible to perform melting treatment of radioactive miscellaneous solid wastes at arbitrary temperatures by the supply of the required electrical power.

The molten matter subjected to the melting treatment in the above-described manner is then injected into a canister (a container made of stainless steel) to form solidified waste matter 24. After the whole of the inside of the melting furnace 12 has been put into the molten state, it is also possible to separate the respective molten waste components on the basis of the differences in specific gravity among them and separately discharged the respective wastes from the melting furnace by an overflow system or a bottom flow system.

Experimental example using simulated miscellaneous solid wastes and their results will be described below. The construction of a melting furnace employed in this example is similar to that shown in FIG. 1. The melting furnace employed had a structure of internal diameter of 50 mm φ and a depth of 80 mm which was divided into ten segments. The high-frequency coil was an 8-turn double coil having an outer diameter of approximately 190 mm φ and a height of approximately 100 mm. The high-frequency power source frequency of the supplied electrical power was 300 kHz.

A mixture of stainless steel chips 50 g and glass beads 50 g was employed as the simulated miscellaneous solid wastes, and induction heating was performed under the above-described testing conditions. The size of the stainless steel chips was a square of 10 mm×10 mm having a thickness of 1 mm. The composition of the glass beads employed was as shown in Table 1. When a high-frequency current was made to conduct through the high-frequency coil, the stainless steel chips first melted as the starting source of direct heating, and the surrounding glass beads melted by the heat source of the molten steel. The melting temperature was approximately 1,500° C. After the melting temperature was held for approximately 30 minutes, the molten waste was cooled. After cooled the solidified matter was taken out from the melting furnace and cut into pieces, and the cut pieces were observed. In this observation, it was confirmed that both stainless steel and glass completely melted to form the solidified matter. It was also confirmed that the stainless steel and the glass were separated in the solidified matter on the basis of the difference in specific gravity therebetween in such a manner that the upper and lower portions of the solidified matter were respectively occupied by the glass and the stainless steel.

TABLE 1

| Components | Composition (weight %) |
| --- | --- |
| $SiO_2$ | 56.1 |
| $Al_2O_3$ | 6.0 |
| $B_2O_3$ | 17.1 |
| $CaO$ | 3.6 |
| $ZnO$ | 3.6 |
| $Li_2O$ | 3.6 |
| $Na_2O$ | 10.0 |
| Total | 100.0 |

The testing conditions used in the above-described embodiment, for example, the number of turns of the heating coil, the number of segments (slits) of the melting furnace and the power source frequency, are selected to be optimum values for the size of the melting furnace, an object to be melted and the like. Needless to say, the present invention is not limited to the aforesaid values.

Since the present invention employs the cold crucible induction melting technique as described above, the constituent materials of the furnace do not make direct contact with the molten matter which is in a molten state, no high-temperature erosion of the constituent materials occurs. Accordingly, the life of the melting furnace is improved, and the amount of occurrence of secondary wastes can be decreased. In the conventional melting technique, the heat-resistance temperature of the constituent materials of the furnace is the upper limit of the furnace operation temperature. However, in the present invention, the molten matter itself is induction-heated and the constituent materials of the furnace are water-cooled, so that this temperature limitation is eliminated. Accordingly, it is possible to perform melting treatment of radioactive miscellaneous solid wastes which contain high melting-point substances such as metals. In the present invention, since part (metals) in the radioactive miscellaneous solid wastes become the starting source of heating and melting, it is possible to collectively perform melting treatment of nonclassified radioactive miscellaneous solid wastes which contain electrically nonconductive materials. In addition, the overflow system or the bottom flow system which utilizes the differences in specific gravity among the molten waste components are adopted to charge the molten matter into a canister or the like, whereby separation of the respective waste components can be easily performed.

What is claimed is:
1. A method of melting treatment of radioactive miscellaneous solid wastes containing therein an electrically conductive substance and other waste components, said method comprising:
charging the radioactive miscellaneous solid wastes into a cold crucible induction melting furnace disposed within a high frequency coil, said melting furnace being water-cooled;
supplying a high-frequency current to the high-frequency coil surrounding the melting furnace to thereby directly heat and melt the electrically conductive substance contained in the miscellaneous solid wastes in said melting furnace; and indirectly heating the other components contained in the miscellaneous solid wastes by utilizing the electrically conductive substance as a starting source of heating and melting, whereby the whole of the radioactive miscellaneous solid waste is converted into a molten state.

2. The method according to claim 1, which further comprises separating the respective molten waste components in the melting furnace on the basis of the differences in specific gravity among the respective molten waste components, and separately discharging the respective molten waste components from the melting furnace by an overflow system or by a bottom flow system.

* * * * *